Oct. 1, 1957 — W. S. LANDON — 2,808,224
SLOW-OPENING FUEL CONTROL VALVE
Original Filed May 15, 1947 — 2 Sheets-Sheet 1
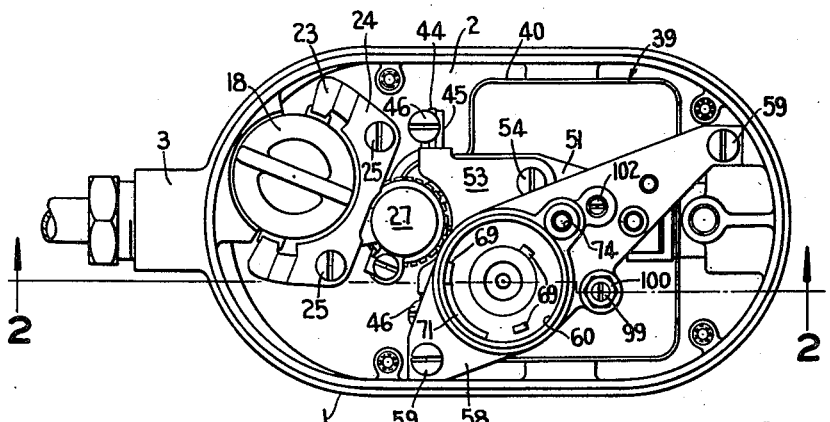
FIG.1
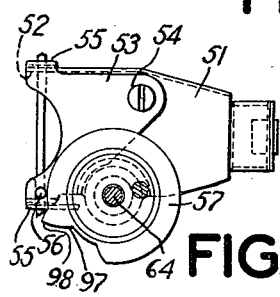
FIG.10
FIG.9
FIG.7
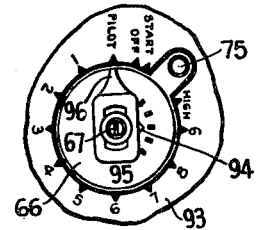
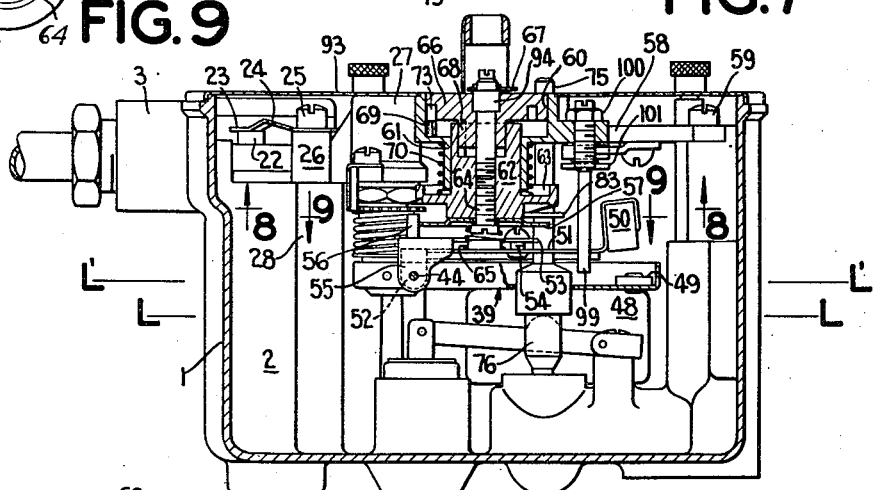
FIG.2
FIG.8
INVENTOR.
WALTER S. LANDON, DEC'D.
BY MARION E. LANDON, ADM'X.
BY Andrew K. Fouled
her ATTORNEY Oct. 1, 1957 W. S. LANDON 2,808,224
SLOW-OPENING FUEL CONTROL VALVE
Original Filed May 15, 1947 2 Sheets-Sheet 2
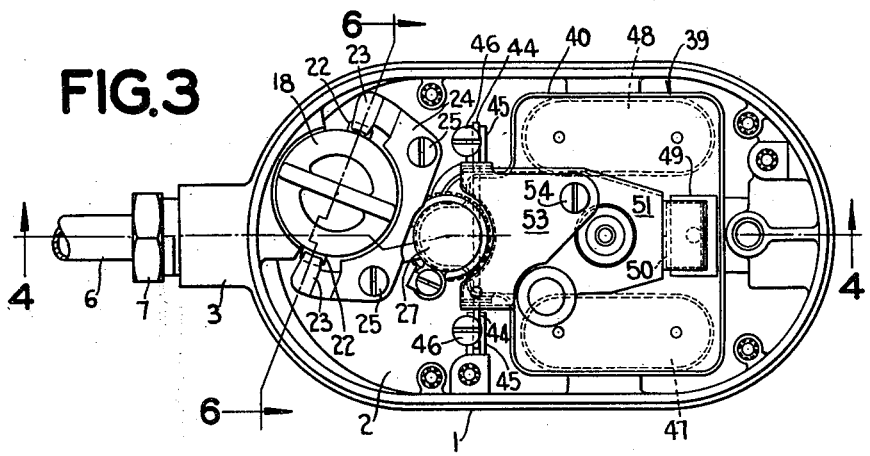
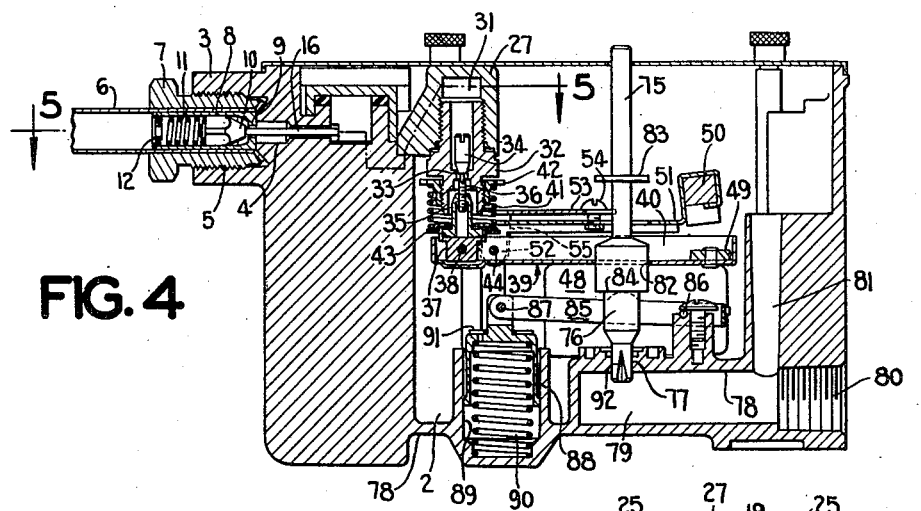
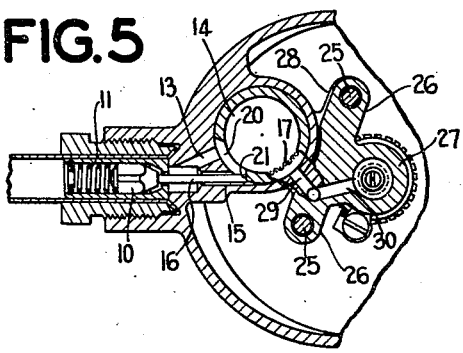
INVENTOR.
WALTER S. LANDON, DEC'D.
BY MARION E. LANDON, ADM'X.
BY Andrew K. Fulde
her ATTORNEY United States Patent Office 2,808,224
Patented Oct. 1, 1957

2,808,224

SLOW-OPENING FUEL CONTROL VALVE

Walter S. Landon, deceased, late of Detroit, Mich., by Marion E. Landon, administratrix, Detroit, Mich., assignor to Detroit Controls Corporation, a corporation of Michigan Original application May 15, 1947, Serial No. 748,299, now Patent No. 2,664,099, dated December 29, 1953. Divided and this application December 4, 1953, Serial No. 396,501

2 Claims. (Cl. 251—51)

This invention relates to new and useful improvement in liquid level control devices and more particularly to such a device which is particularly adapted for controlling the supply of liquid fuel to a gravity fed burner.

Another object is to provide a metering control for the outlet port in which the rate of initial flow from the control device is predetermined irrespective of the rate of opening movement of the valve closure means.

The invention consists in the improved construction and cooperable relation of parts to be more fully described hereinafter and the novelty of which will be particularly pointed out and distinctly claimed.

In the acccompanying drawings to be taken as a part of this specification, there are fully and clearly illustrated several preferred embodiments of the invention, in which drawings, Figure 1 is a top plan view of one from of the control device having the cover plate removed to show internal construction, Fig. 2 is a view in vertical section on the line 2—2 of Fig. 1 but showing the cover member in place, Fig. 3 is a top plan view similar to Fig. 1, but having the outlet port metering valve and its supporting structure removed, Fig. 4 is a view in section on the line 4—4 of Fig. 3, Fig. 5 is a detail view in section on the line 5—5 of Fig. 4, Fig. 6 is a detail view in section on the line 6—6 of Fig. 3, Fig. 7 is a detail plan view of a portion of the cover member showing the metering valve manual control member and its cooperating indicia, Fig. 8 is a detail view in section showing the metering valve operating cam mechanism and taken upwardly on the line 8—8 of Fig. 2, Fig. 9 is a detail view in section on the line 9—9 of Fig. 2 showing certain reset and float supporting structure, Fig. 10 is a bottom plan view of a metering valve hand grip adjustment member.

Referring to the drawing by characters of reference, the reference numeral 1 designates generally a casing providing a liquid level chamber or reservoir 2 which is of substantially rectangular form with rounded end portions or walls. Above the maximum possible liquid level in the chamber 2 and opening through a laterally projecting inlet nipple 3 there is an inlet passageway 4 having an enlarged internally screw threaded bore 5. A flared inlet pipe or conduit 6 leading from a source of liquid fuel supply such as a tank or pump is secured in the bore 5 by a sleeve flare nut 7. A cartridge type shut-off valve 8 is contained within the outlet end of the tube or pipe 6 and comprises a cylinder having a valve port 9 through its end wall and containing a check valve member 10 which is urged toward port closing position by a coil spring 11 held under compression against a ported aperture member or disc 12 secured in the outer end of the member 8. The passageway 4 has a branch portion 13, see Fig. 5, which opens substantially laterally into a vertically positioned cylindrical strainer chamber 14. The passageway 4 also has an extension 15 opening substantially tangentially into the chamber 14 and which provides a guide-way for a valve operating rod 16 extending from the valve member 10 and projecting into the chamber 14. Within the chamber 14 there is a cylindrical strainer 17 closed at its bottom end and secured and sealed at its upper end to a flanged substantially cylindrical cap member 18, see Fig. 6, which substantially fits the upper end of the chamber 14. The cylindrical wall of the member 18 below its transverse closure wall 19 has a circumferential recess 20 providing an inlet port to the interior of the strainer 17 and alined with the passageway portion 13. One side wall 21 of the recess 20 serves as a thrust member or abutment receiving the free end of the valve operating rod 16. The cap member flanges or ears 22 serve as locking dogs engageable under spring fingers 23 of a substantially U-shaped resilient plate member 24 secured by screws or the like 25 to bosses 26 on an inlet fitting member 27 which is clampable by the screws 25 to bosses 28 projecting from the strainer member housing. The recess wall 21 holds the valve member 10 in open position and the spring 11 under compression. Through the side wall of the strainer housing there is an outlet port 29 which terminates within the strainer chamber wall and opens upwardly through the top surface of the portion interconnecting the bosses 28. The outlet port 29 joins a port or passageway 30 in the fitting member 27 extending at an upward inclination to the central inlet valve chamber 31. Screw threaded into the chamber 31 there is a valve port member 32 having an inlet port 33 with oppositely facing valve seats. Cooperable with these seats there is a normally acting inlet valve 34 and a safety valve member 35 which are interconnected by a screw threaded stem 36 extending from the valve member 34 and adjustably screw threaded in the valve member 35, the valve member 34 being provided with a screw-driver slot or the like for relative adjustment and spacing of the valve members from each other. The lower or safety valve member 35 has the convex supporting surface which seats on the inner bottom wall or base of a cup-like supporting member 37 which is pivotally connected by a pin 38 to a pan-like lever 39, the pin 38 extending through apertures in the opposite side wall flanges 40. The thickness or height of the base flange of the valve member 35 is less than the height of the rim or inner side wall of the supporting member 37, as will be apparent from Fig. 4, so that lost motion of the valve member 34 relative to the lever 39 is permitted to the extent of this difference in heights. The normally acting upper valve member 34 is urged toward its seat by gravity and, when the lost motion is taken up, by a coil spring 41 positioned between an adjustable sleeve abutment 42 screw threaded on the seat member 32 and an abutment member 43 comprising as apertured flanged disc receiving the lower valve member 35 and seating on the supporting member 37. The lever member 39 is urged counter-clockwise by the spring 41 and is pivotally supported by a shaft 44 which is supported at its end portions in V-notched bosses 45 projecting upward from the casing bottom wall, the shaft being held and located in the V-notches by the head portions of screws 46. Secured as by rivets or the like to the underside of the member 39 there are laterally spaced or front and rear positioned float members 47 and 48 which cooperate with the spring 41 by their buoyant force to move the valve member 34 toward closed position. Cooperable with the lever member 39 there is a magnetic member or armature 49 fixed centrally at the free end portion of the lever member 39 and on its upper face. Cooperable with the armature 49 there is a horse-shoe type permanent magnet 50 carried by a supporting arm 51 having one or more longitudinal reinforcing flanges and fulcrum ears 52 pivotally supporting the arm on the shaft 44. The arm 51 is adjustably connected to an overlying substantially parallel arm 53 by means of an adjustment screw 54 extending through the arm 53 and screw threaded into the arm 51. The arm 53 has downward extending side flanges 55 which overlap the ears 52 and are apertured for passage of the shaft 44 therethrough and fulcruming of the arm 53 thereon. The arm 53 has an upward extending post 56, see Figs. 2 and 9, cooperable with a combination cam and stop member 57 to normally support the magnet 50 in predetermined relation to the armature 49 when the valve member 34 is seated to close the port 33 in normal float operation.

Extending diagonally across the float chamber there is a saddle-like supporting member or plate 58 which is secured adjacent its ends by screws 59 to supporting bosses projecting from the casing side walls. In the top face of the member 58 there is a substantially cylindrical recess 60 having concentric therewith a downward extending tubular flange and guide sleeve 61. Rotatably fitting in the sleeve 61 there is a cam member 62 having a cam wheel 63 positioned below the lower end of the sleeve 61 and having a helical cam underface in the form of a spiral flange. The combination cam and stop member 57 is clamped to the lower end face of the member 62 by a screw 64. The magnet supporting arm 53 is held with the post 56 against member 57 by a coil spring 65 secured at one end to the plate member 57 by the head of the screw 64 and bearing at its other end against the hand grip member 66 which rotatably fits in the saddle lever arm 51. The cam member 62 is supported by a member recess 60, the members 66 and 62 being secured together by a bolt 67 and being held for rotation as a unit by a rib and keyway 68. The grip member 66 is normally supported on spaced lugs 69 and is held against the top faces thereof by a coil spring 70 held under compression between the underface of the member 58 and the cam wheel portion 63. Through the bottom wall of the recess 60 there is an arcuate aperture 71 terminating at one end in the outermost one of the lugs 69 which serves as a stop to limit rotation of the member 66 to about 350°. Cooperable with the slot 71 there is a finger 72, the member 66 also having arcuate slots 73 cooperable with and to receive the lugs 69 when the lugs and slots are in registry and the finger 72 is in registry with the slot 71, to permit the spring 70 to move the cam member 62 downward. Reciprocally guided through an aperture 74 through the saddle member 58 at the side of the recess 60 is the stem 75 of a metering valve 76 controlling flow through an outlet port 77 in the bottom wall 78 of the chamber 2. The portion of the wall 78 through which the port 77 opens, forms the top wall of an outlet passageway 79 having an internally screw threaded end 80 for receiving the fuel burner supply pipe. A vent passage 81 leads upward from the passageway 79 into the chamber 2 above the maximum possible liquid level therein. The valve stem 75 extends downward through alined apertures in the lever arm 51 and through the bottom wall of the pan-like lever member 39, the stem 75 substantially fitting the pin aperture 82 by permitting flow therethrough into the chamber 2. On the stem 75 there is a lateral flange or projection 83 providing a cam follower portion cooperable with the helical surface of the cam wheel 63. The stem 75 also has a downward facing shoulder 84 cooperable with a lever 85 pivoted on a shaft 86 and secured at its free end by a pin 87 to a dash-pot piston 88. There is a dash-pot chamber 89 formed in the bottom wall 78 in which the piston 88 is movably positioned, said piston being urged upward by a coil spring 90 so as to hold the cam follower flange 83 in engagement with the cam wheel 63. An upward opening check valve 91 carried by the piston 88 permits rapid downward movement of the lever 85 and metering valve 76 while causing a delayed gradual opening movement of the valve 76. It will be apparent that the force of the spring 90 and the clearance of piston 88 can provide a predetermined time delay in the opening movement of the valve 76 to its full open position. The valve 76 is provided with a fuel metering slot 92 which may be of the usual inverted V groove type.

The chamber 2 is closed by a cover member 93 which is apertured to receive the cylindrical wall of the recess 60 and for passage of the stem 75 therethrough. Secured on the upper end of the bolt 67 there is a pointer 94 cooperable with indicia 95 on the top face of the member 66 to indicate the position of the valve 76 relative to its seat in the pilot flow position of the hand grip member 66 when the cam surface of wheel 63 is at its minimum flow position and the member 66 is resting on the top faces of the lugs 69, i. e. when the slots 73 are out of registry with the lugs 69. This adjustment is, of course, made when the pointer 96 is alined with the mark designated "Pilot" on the cover member 93. On the cover member 93 there is also the position designated "Off" which corresponds to registry of the lugs 69 with the slots 73 and in which position the valve 76 is seated on the wall 78 to close the port 77. Also in clockwise rotation from the "Pilot" point and beyond the "Off" point there is a point designated "Start" which is the position to and beyond which the pointer 96 is moved to bring the valve member 35 away from its inlet port seat without, however, seating the upper valve member 34 so that liquid fuel can flow into the empty chamber 2. This "Start" position corresponds to the circumferentially recessed portion 97 of the combined cam and stop disc 57, see Fig. 9. It will be noted that the disc 57 has a protuberant cam portion 98 for the purpose of disengaging the magnet 50 from the armature 49, a stop rod 99 cooperating with the pan-like lever member 39 to limit upward movement of the armature 49 to accomplish this purpose. The rod 99 is adjustably screw threaded through the saddle member 58 and is held in adjusted position by a lock nut 100. Opening movement of the valve 76 may be limited by a stop member 101 cooperable with the stem projection or flange 83 and adjustable screw threaded through the saddle member 58, it being provided with a screw driver slot adjustment 102, see Fig. 1.

The operation of the device in Figs. 1 to 10 is as follows:

When the strainer chamber cover member 18 is locked in position as shown in Fig. 1 then the valve member 10 is in open position so that fuel from the source of supply, not shown, will feed through the inlet pipe 6 into the interior of the strainer 17 and therethrough into the passageway 29 and 30 leading to the inlet valve chamber 31. If the float chamber 2 is empty, the float mechanism 39 will be in its lowermost or down position so that the valve member 35 will be seated against and closing the port 33. In order to admit fuel to the chamber 2, it will, therefore, be necessary to open the valve member 35 and this is accomplished by rotating the hand grip member 66 until the finger 96 is at the "Start" position of Fig. 7 which will permit the post 56 to drop into the recess portion 97, see Fig. 9, so that the magnet 50 will drop into attractive position to the armature 49. The hand grip member 66 is then rotated counter-clockwise to or beyond the "Off" position which will push past 56 toward the left facing Fig. 2 thereby rotating the magnet 50 upward and lifting the valve member operating lever mechanism 39 to a position in which the valve members 34 and 35 will both be unseated so that fuel will flow through the port 33 into the pan-like lever member 39 and thus through the aperture 82 into the chamber 2. The protuberance 98 will move the post 56 sufficiently counter-clockwise so that the magnet 50 will be freed from the armature 49 due to the arm member or pan 39 engaging the post 99 and being stopped in its upward movement.

The inflowing fuel to the chamber 2 will fill the same to the desired normal substantially constant liquid level indicated by the line L—L, at which level the float members 48 will seat the valve member 34 to stop further inflow of liquid through the port 33. When the hand grip member 66 is rotated further in a counter-clockwise direction, the cam surface of the wheel 63 will be lifted away from the valve stem flange 83 and permit the dashpot spring 90 to move the valve 76 toward open position. In the "Off" position the lugs 69 will be in their respective recesses 73. The first action upon counter-clockwise rotation of the hand grip member 66 toward "Pilot" position will be a camming of the hand grip member 66 and the cam wheel 63 upward by the inclined end portions of the slots 73 which will bring the hand grip member 66 to the position of Fig. 2 without, however, having caused any upward travel of the stem flange 83 upon the cam surface of the cam wheel 63. Irrespective of the rate of rotation of the hand grip member 66 and the consequent rate of lifting of the cam surface away from the flange 83, the rate of opening movement of the valve 76 will be predetermined by the action of the dash-pot piston 88 and its spring 90, so that for normal operation of the hand grip member for burner igniting operation when the hand grip member would be rotated to full counter-clockwise or "High" position the flow of fuel through the metering valve outlet 77 to the burner will have a time delay and not flood the burner before the fuel can be ignited. Irrespective of the position of the valve 76 under the control of the cam wheel member 63, the float mechanism will tend to maintain a substantially constant liquid level in the chamber 2 and more nearly constant than with the usual simple inlet valve and float member arrangement. This is due to the pan-like lever member 39 which counter-weighs the float members 48 by the weight of the incoming liquid so that the float members 48 will be depressed into the liquid thereby raising the level in the float chamber by liquid displacement, whereas as when the normally acting valve member 34 closely approaches its seat the quantity of liquid in the pan-like lever member 39 will be decreased thereby resulting in the float members 48 displacing less liquid within the chamber 2. Should the valve member 34 fail to close the port 33 so that the liquid level in the chamber 2 increases above the line L—L, the float members 47 and 48 will follow with the increasing level due to the lost motion of the valve member 34 relative to its supporting member 37 and lever 39. When the level gets to some predetermined higher liquid level such for example, as the line L'—L', which further level is adjustable by the screw 54, then the magnet 50 will actively attract the armature 49 and lift the lever arm 39 with a quick action thereby tightly seating the valve member 34 to close the port 33 and shut off further inflow of fuel to the chamber 2. If the float members 47 should become "water-logged" or sink to the bottom of the chamber 2 for any reason, then the valve member 35 will be lifted to port closing position against the downward facing seat of the port 33 thereby stopping further inflow of fuel to the chamber 2. It will be apparent that the end of the stem 75 which projects above the cover plate 93 permits of the application to the control device of automatic means for actuating the valve 76 such, for example, as a thermostatic bimetal heat motor or the like which might be remotely controlled, the cam wheel 63 under such conditions being positioned to determine the maximum opening movement of the valve 76 when the stem 75 is released by the automatic actuator.

This application is a division of my copending application, Serial No. 748,299, filed May 15, 1947, for Liquid Level Control Means, now Patent No. 2,664,099, dated December 29, 1953.

What is claimed and is desired to be secured by Letters Patent of the United States is:

1. A liquid flow controlling device comprising a casing having a liquid receiving chamber with an inlet and with an outlet below the normal liquid level in said chamber, a reciprocal metering valve controlling said outlet and having an abutment portion, a dashpot having a movable piston positioned within said casing, a lever member movably secured at one end to said casing and at the other end to said dashpot piston, said lever member abutting said metering valve abutment portion, spring means urging said lever member against said valve abutment portion, adjustable means to move said valve in one direction against the bias of said spring means and operable to determine the extent of metering valve movement in the opposite direction by the bias of said spring means, and said dashpot controlling the rate of movement of said valve in said last named direction.

2. In a liquid flow controlling device, a casing having a bottom wall with an outlet aperture therethrough, a reciprocal valve member movable toward and away from said aperture and operable to control flow therethrough, said valve member having an abutment portion thereon intermediate its end portions, said casing having a dashpot chamber extending upward from said bottom wall, a dashpot piston positioned in said dashpot chamber, a spring member urging said dashpot piston away from said casing bottom wall, a lever member movably secured at one end to said casing and at the other end to said dashpot piston, said lever member abutting said valve member abutment portion and urging said valve member away from said aperture, means to move said valve member toward said aperture against the bias of said spring and to determine the extent of valve member movement away from said aperture by the bias of said spring, and said dashpot piston through said lever controlling the rate of movement of said valve member away from said aperture.

References Cited in the file of this patent

UNITED STATES PATENTS

| 478,963 | Hankenhof | July 12, 1892 |
| 598,386 | Noble | Feb. 1, 1898 |
| 1,184,563 | Odet | May 23, 1916 |
| 2,207,123 | Johnson | July 9, 1940 |
| 2,271,183 | De Lancey | Jan. 27, 1942 |